(12) United States Patent
King

(10) Patent No.: US 7,556,292 B2
(45) Date of Patent: Jul. 7, 2009

(54) MOTORCYCLE HEAT SHIELD

(76) Inventor: Patrick E. King, 780 NE. 69 St., Unit 809, Miami, FL (US) 33138

( * ) Notice: Subject to any disclaimer, the term of this patent is extended or adjusted under 35 U.S.C. 154(b) by 429 days.

(21) Appl. No.: 11/367,392

(22) Filed: Mar. 6, 2006

(65) Prior Publication Data
US 2007/0205032 A1 Sep. 6, 2007

(51) Int. Cl.
B62J 1/18 (2006.01)
(52) U.S. Cl. .................. 280/770; 297/219.11; 150/167; 280/288.4
(58) Field of Classification Search ............ 297/219.11, 297/219.1, 228.13; 150/167; 280/770
See application file for complete search history.

(56) References Cited

U.S. PATENT DOCUMENTS

| 3,901,549 | A | * | 8/1975 | Ramirez ................ 296/78.1 |
| 3,940,166 | A | * | 2/1976 | Smithea ................ 297/215.11 |
| 4,023,821 | A |   | 5/1977 | Eiland |
| 4,068,859 | A | * | 1/1978 | Dittman ................ 280/304.4 |
| 4,469,256 | A | * | 9/1984 | McEwen ................ 224/413 |
| 5,018,564 | A | * | 5/1991 | Anglin et al. ............ 150/167 |
| 5,080,431 | A | * | 1/1992 | Frazier ................ 297/184.11 |
| 5,490,549 | A | * | 2/1996 | Biette ................ 150/167 |
| 5,966,933 | A |   | 10/1999 | Ishihara et al. |
| 6,062,601 | A | * | 5/2000 | Willie et al. ............ 280/770 |
| 6,073,998 | A | * | 6/2000 | Siarkowski et al. .... 297/180.12 |
| 6,113,142 | A | * | 9/2000 | Tolbert ................ 280/770 |
| 6,120,083 | A | * | 9/2000 | Gunther ................ 296/78.1 |
| 6,179,313 | B1 |  | 1/2001 | Christensen |
| 6,516,844 | B1 | * | 2/2003 | Henry ................ 150/167 |
| 6,663,128 | B2 | * | 12/2003 | Dichter ................ 280/288.4 |
| 6,854,542 | B2 | * | 2/2005 | Schoonover ............ 180/68.2 |
| 6,893,087 | B2 | * | 5/2005 | Hancock et al. ........ 297/219.11 |
| 6,948,739 | B2 | * | 9/2005 | Gallagher et al. ........ 280/770 |
| 6,971,715 | B2 | * | 12/2005 | Hankins ................ 297/219.11 |
| 7,258,357 | B1 | * | 8/2007 | Berezny ................ 280/288.4 |
| 7,267,369 | B2 | * | 9/2007 | Gallagher et al. ........ 280/770 |
| 7,367,577 | B1 | * | 5/2008 | Garrett ................ 280/288.4 |
| 7,416,250 | B1 | * | 8/2008 | DiFilippo ............ 297/228.11 |
| 2004/0021352 | A1 | * | 2/2004 | Montone ................ 297/219.11 |
| 2007/0257478 | A1 | * | 11/2007 | Metzikis ................ 280/770 |

* cited by examiner

Primary Examiner—Jeffrey J Restifo
(74) Attorney, Agent, or Firm—Pequignot + Myers LLC; Matthew A. Pequignot

(57) ABSTRACT

Apparatus for installation on a motorcycle which is capable of shielding one or more riders thereof from heat generated during motor operation. In preferred embodiments, apparatus with a plurality of detachable shield panels which are capable of protecting one or more riders from excess heat generated by the operation of a motorcycle, and, conversely, in which the shield panels can be removed to provide beneficial heat to the rider and/or passenger when desired.

11 Claims, 3 Drawing Sheets

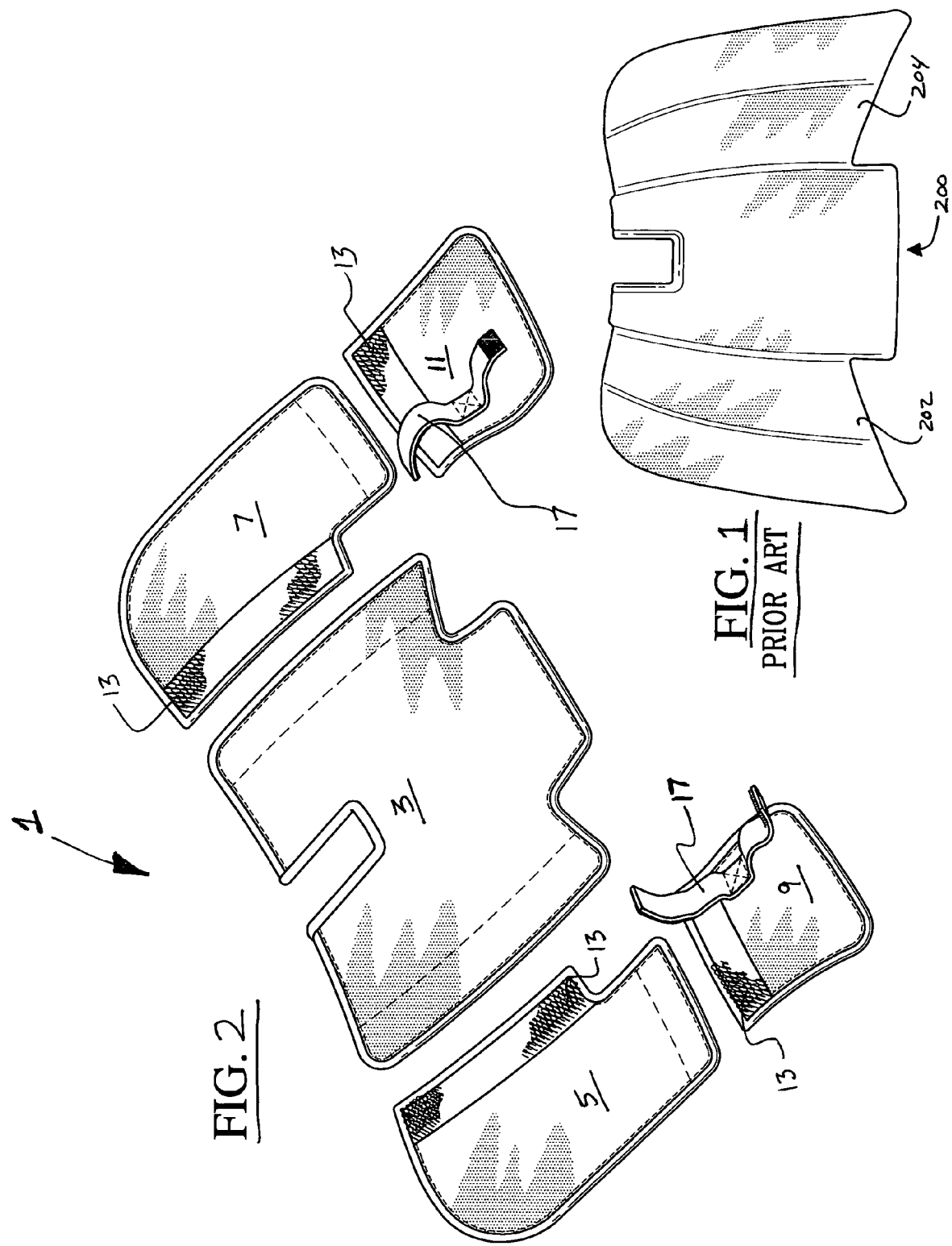

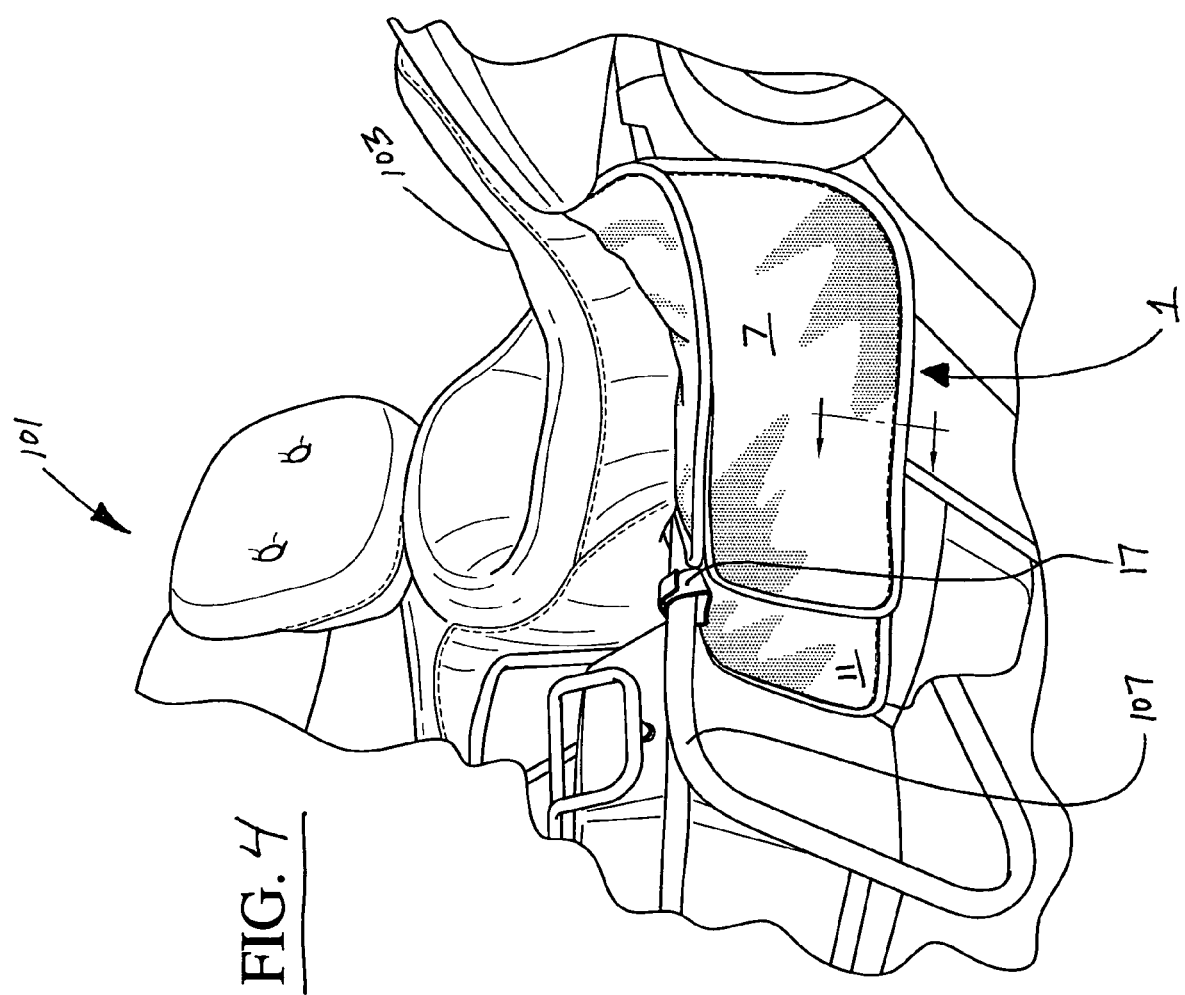
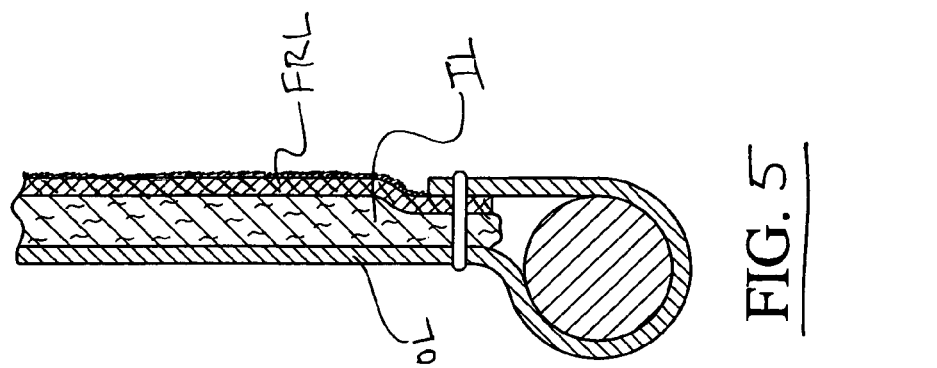

MOTORCYCLE HEAT SHIELD

FIELD OF THE INVENTION

This invention relates to an apparatus for installation on a motorcycle which is capable of shielding one or more riders thereof from heat generated during motor operation. In preferred embodiments, this invention relates to an apparatus with a plurality of detachable shield panels which are capable of protecting one or more riders from excess heat generated by the operation of a motorcycle, and, conversely, in which the shield panels can be removed to provide beneficial heat to the rider and/or passenger when desired.

BACKGROUND OF THE INVENTION

A typical motorcycle generates considerable heat during operation, which, depending on operating conditions and weather, for example, can be the source of considerable discomfort to a motorcycle rider and/or his/her passenger. For example, during summer months and/or when a motorcycle is being operated at slow speeds (e.g., in traffic, group rides, parades, etc.), the significant heat generated by the operation of the vehicle is not sufficiently dissipated (e.g., via the wind at higher speeds). Instead, the radiating heat causes significant discomfort to the motorcycle rider(s). Moreover, in extreme weather or operating conditions, for example, such as during rides in the desert, or when a police officer is riding slowly as a patrol during a parade, the heat generated by the motorcycle can become unbearable.

In order to address this problem in the motorcycle arts, certain devices have been developed which attempt to protect or shield a motorcycle rider from vehicle generated heat. An example of one such device is described in U.S. Patent Publication No. 2004/0021352. A second example of a known device is manufactured by the company Shamrock Saddles under the trade-name Shamrock Shield (an example of the device is illustrated in the drawings and labeled as "Prior Art"). Although the aforementioned devices solve, to a degree, certain of the problems described above, deficiencies related to the use or performance of such devices have recently been recognized. Furthermore, additional problems and/or desires in the motorcycle arts are not addressed by such devices.

Specifically, although it is beneficial in some circumstances to deflect the heat generated by a motorcycle away from the rider or passenger, in other circumstances, it may be desired that the heat not be deflected. For example, when riding a motorcycle at typical operational speeds in the mountains where temperatures are lower due to elevation and where significant body heat loss is typically experienced by the vehicle passenger(s) due to wind speeds, it may be desirable that the heat from the motorcycle be un-deflected (e.g., un-shielded) and, instead, be permitted to heat the rider(s). Moreover, in some geographical locations, large elevational changes can be experienced during road travels in a single day (particularly in the mountain ranges and/or deserts of the western United States). In such circumstances, it is conceivable that during one part of a day or a "ride" that the vehicle rider will wish to deflect heat and that during a later portion of the day or ride that the rider will benefit from the heat due to lowered ambient temperatures. Still furthermore, personal preferences may dictate that a motorcycle operator and his/her passenger desire that the heat from the vehicle be deflected or un-deflected at different times regardless of the operating conditions (due to different individual temperature comfort levels or clothing coverage or type, for example). For such reasons and others, it would be desirable to have a motorcycle heat shield which could be removed and/or tailored for different personal preferences, numbers of riders, and/or to accommodate varying weather or operational conditions with minimal effort and time.

In view of the above-enumerated drawbacks, it is apparent that there exists a need in the art for apparatus which address at least one of the above problems or desires pertaining to prior art motorcycle heat deflectors. It is a purpose of this invention to fulfill this need in the art as well as other needs which will become more apparent to the skilled artisan once given the following disclosure.

SUMMARY OF THE INVENTION

Generally speaking, this invention fulfills the above described needs in the art by providing:

a heat shield apparatus for a motorcycle comprising:

an attachment portion configured for attaching to an area of a motorcycle proximal a vehicle operator seat of the motorcycle;

a first wing shield portion removably connected to the attachment portion, the first wing shield portion being so configured and connected thereto such that the first wing shield portion blocks at least a portion of heat generated by the motorcycle from contacting an operator seated on the motorcycle when the apparatus is installed on the motorcycle and the motorcycle is in motor operation;

a second wing shield portion removably connected to the attachment portion, the second wing shield portion being so configured and connected thereto such that the second wing shield portion blocks at least a portion of heat generated by the motorcycle from contacting an operator seated on the motorcycle when the apparatus is installed on the motorcycle and the motorcycle is in motor operation;

wherein the first and the second wing shield portions are user removable from the attachment portion without removing the attachment portion from attachment to the motorcycle.

In another embodiment, there is provided:

a heat shield apparatus for a motorcycle comprising:

an attachment portion configured for attaching to an area of a motorcycle proximal a vehicle operator seat of the motorcycle;

a first wing shield portion connected to the attachment portion, the first wing shield portion being so configured and connected thereto such that the first wing shield portion blocks at least a portion of heat generated by the motorcycle from contacting an operator seated on the motorcycle when the apparatus is installed on the motorcycle and the motorcycle is in motor operation;

a second wing shield portion connected to the attachment portion, the second wing shield portion being so configured and connected thereto such that the second wing shield portion blocks at least a portion of heat generated by the motorcycle from contacting an operator seated on the motorcycle when the apparatus is installed on the motorcycle and the motorcycle is in motor operation; and wherein the heat shield apparatus includes a vehicle forward portion and a vehicle rearward portion and further includes:

a first auxiliary wing shield portion extending generally proximal from the rearward portion, the first auxiliary wing shield portion being so sized, configured, and located such that the first auxiliary wing shield portion blocks at least a portion of heat generated by the motorcycle from contacting a backseat passenger on the motorcycle when the apparatus is installed on the motorcycle and the motorcycle is in motor operation; and a second auxiliary wing shield portion extending generally proximal from the rearward portion, the second auxiliary wing shield portion being so sized, configured, and located such that the second auxiliary wing shield portion blocks at least a portion of heat generated by the motorcycle from contacting a backseat passenger on the motorcycle when the apparatus is installed on the motorcycle and the motorcycle is in motor operation.

BRIEF DESCRIPTION OF THE DRAWINGS

FIG. 1 illustrates a plan view of a prior art heat shield apparatus.

FIG. 2 illustrates a three-dimensional, plan view of a motorcycle heat shield according to one embodiment of the subject invention.

FIG. 4 illustrates the embodiment of the heat shield depicted in FIG. 2 shown installed on a motorcycle (with the motorcycle seat in place).

FIG. 5 illustrates a cross-section of a portion of a wing of the heat shield depicted in FIG. 4 according to one embodiment of the subject invention.

DETAILED DESCRIPTION OF CERTAIN EMBODIMENTS

Figure 3:
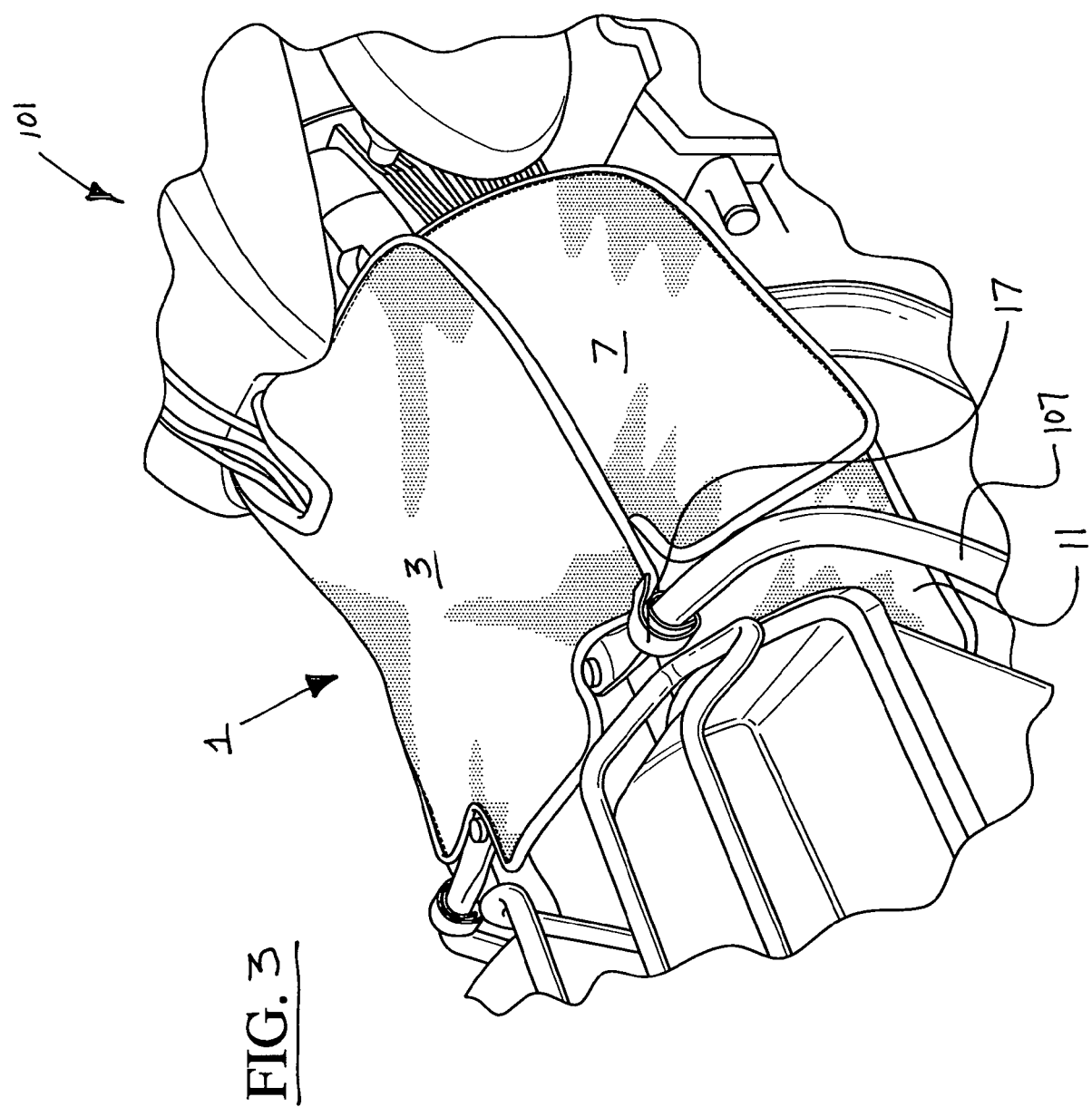
FIG. 3 illustrates the embodiment of the heat shield depicted in FIG. 2 shown partially installed on a motorcycle (with the motorcycle seat removed).

For a more complete understanding of the present invention and advantages thereof, reference is now made to the following description of various illustrative and non-limiting embodiments thereof, taken in conjunction with the accompanying drawings in which like reference numbers indicate like features.

Referring initially to FIG. 1, therein is illustrated one example of a prior art heat shield 200 (having a pair of shield panels 202, 204) which, as discussed in the BACKGROUND section above, fails to address certain problems and desires in the art. In this regard, the illustrated heat shield does provide limited heat shielding functionality but does not accomplish, and is not capable of accomplishing, one or more of certain functionalities capable of being accomplished by the heat shield apparatus of the instant invention described with reference to FIGS. 2-5 below.

Turning now to FIG. 2, an example embodiment of heat shield apparatus 1 is illustrated therein. Generally speaking, apparatus 1 comprises a central body portion or attachment portion 3 having a pair of wing shield portions 5 and 7 attached at its opposite lateral sides. In preferred embodiments as illustrated, wing shield portions 5 and 7 are detachable from body portion 31 when desired. Additionally, in the exemplary embodiment which is illustrated, apparatus 1 further includes a pair of auxiliary wing shield portions 9 and 11 each located and removably attached to one of the main wing shield portions 5 and 7. It is noted, as can be seen, that FIG. 2 illustrates apparatus 1 with each wing shield portion 5, 7, 9 and 11 detached from the central body or attachment portion 3. However, in the embodiment which is illustrated, when fully assembled, each wing shield portion is attached to body portion 3 via Velcro connections 13. Alternative embodiments of connecting wing shields 5, 7, 9 and 11 to the body are, of course, contemplated (with preferred embodiments employing connector types which permit quick user attachment and detachment for tailorability as discussed below).

Referencing now FIG. 3, the embodiment of apparatus 1 depicted in FIG. 2 is shown therein partially installed onto motorcycle vehicle 101. In order to install the apparatus of the invention on a motorcycle such as that depicted as 101, first the motorcycle seat is removed. Second, after removal of the seat, central body or attachment portion 3 is draped over the central body (e.g., chassis) of the motorcycle with or without one or more of wing shield portions 5, 7, 9 and/or 11 attached. Once body 3 is appropriately installed on the chassis of motorcycle 101, seat 103 can be reinstalled on the vehicle such as depicted in FIG. 4.

Referring now, in the alternate, to FIGS. 3 and 4, it can be seen that apparatus 1 is illustrated with its main and auxiliary wing shield portions attached. When wing shield portions 5 and 7 are installed as illustrated, each shield portion is appropriately located in order to function to shield the left and right body portions of a vehicle rider from heat generated during motorcycle motor operation, e.g., the left and right legs and lower torso of a rider. Specifically, wing shields 5 and 7 are located and configured such that when a rider sits on and operates motorcycle 101, they are a physical barrier (and in some respects, a reflector or deflector, in certain embodiments) of emissive energy produced by certain heat generating portions of the motor vehicle, e.g., the vehicle motor and manifold.

In addition to protecting the motorcycle driver or operator seated in the primary seat of a motorcycle, heat shield apparatus 1 is capable of additionally providing heat shielding benefits to secondary passengers of the motorcycle (e.g., "backseat" passengers). For example, it is common that a second rider will ride a motorcycle seated behind the operator of the vehicle. Seated in such a location, without the benefit of the unique functionality of the instant invention, the second passenger would not normally be protected to an adequate or desirable extent from the heat generated by operation of the motorcycle (e.g., such as by the inadequate protection of the heat shield 200 illustrated as prior art in FIG. 1). However, solving this problem, the inclusion of auxiliary wing shields 9 and 11, in preferred embodiments of the herein-described invention, provide such thermal protection to rear passengers not previously provided by apparatus known in the prior art.

In addition to the improvements over the prior art achieved as described above, certain embodiments, of the present invention address certain additional needs and/or problems as will now be explained. For example, as discussed in the BACKGROUND section herein, in certain motorcycle operating conditions or environments, it may be desirable, rather than to shield (block or deflect/reflect) heat from the motorcycle passenger or passengers, to permit the vehicle generated heat to, instead, warm the passenger(s) during operation. Moreover, it is noted that the desire to block or deflect (or reflect) heat or, alternatively, to employ it for its warmth is a personal preference and, therefore, may change over the course of the day (e.g., over the course of several hours or even minutes). Therefore, certain preferred embodiments of the instant invention, such as illustrated in FIG. 2, employ shield panels, e.g., wing shields 5, 7, 9 and/or 11, which can be quickly removed and/or assembled to the central body as desired (other embodiments not having such functionality/tailorability are, of course, contemplated). In such embodiments, it is further advantageous that such shield panels are removable and installable without necessitating removal of central body portion 3 from the motorcycle. Specifically, allowing the shield panels to be attached and detached in such a manner allows the heat shielding functionality to be tailored according to individual preferences, operating conditions, and/or operating environments without requiring time-consuming removal of the vehicle seat.

In still additional embodiments, yet further improvements over the prior art are achieved. For example, at least one embodiment of apparatus 1 further achieves advantages over prior art heat shields with its unique combination of layer materials which provide comfort to the vehicle operator and/or passenger as well as provide insulating properties and protection from fire. In one such embodiment, shield panels 5, 7, 9 and 11 and preferably central body or attachment portion 3 comprise a series of "sandwiched" material layers, each layer having it's own specific functionality. Turning now to FIG. 5, an example of such a layer system or "sandwich" is illustrated therein.

In particular, FIG. 5 illustrates a cross-section of wing shield panel 7 (depicted installed on a motorcycle in FIG. 4). In this example cross-section, the outer layer "OL" of the wing shield panel is a vinyl or leather material (or some other durable material) provided principally as a surface which is comfortable to the "touch" of the motorcycle rider (because of surface characteristics, pliability, etc.). Below the outer vinyl or leather layer, an insulating layer "IL" is provided which principally serves to prevent (or reduce) heat generated by the motorcycle from being transmitted through this thickness of the wing shield panel. In order to accomplish this, in at least one embodiment, the insulating layer "IL" includes a heat reflective (or deflective) layer, such as a metal foil (not shown), as well as an insulating layer bonded to the reflective (or deflective) layer. Enclosing the opposite side of wing shield panel 7 is a third layer in contact with the insulating layer (which, when installed, is in direct contact with various motorcycle parts). Due to the contact of this layer with heated engine/motorcycle parts, the third layer, in preferred embodiments, is a fire retardant layer "FRL," which aids in preventing combustion of the wing shield panel as a result of its contact with extremely hot portions of the motorcycle motor or engine. An exemplar material which is preferred for use as such a fire retardant in certain embodiments is commercially available under the trade-name Pantherfelt.

Although not required, certain embodiments of heat shield apparatus 1 include mechanisms for better securing the individual shield panels to a motorcycle. For example, as illustrated in FIGS. 2-4, auxiliary wing shield panels 9 and 11 each include a Velcro strapping system 17 which may be used to aid in securing such panels to the vehicle, e.g., by securing the Velcro strap systems around fixed frame portions as illustrated. Although not shown in the drawings, it is, of course, contemplated that alternative strap or other securement types, in addition to or in place of Velcro straps 17, can be used associated with apparatus 1 (or its component parts) to further secure it to motorcycle 101.

Once given the above disclosure, many other features, modifications, and improvements will become apparent to the skilled artisan. Such other features, modifications, and improvements are therefore considered to be part of this invention, the scope of which is to be determined by the following claims:

I claim:

1. A heat shield apparatus for a motorcycle, comprising:
   an attachment portion configured for attaching to an area of a motorcycle proximal a vehicle operator seat of said motorcycle;
   a first wing shield portion removably connected to said attachment portion, said first wing shield portion being so configured and connected thereto such that said first wing shield portion blocks at least a portion of heat generated by said motorcycle from contacting an operator seated on said motorcycle when said apparatus is installed on said motorcycle and said motorcycle is in motor operation;
   a second wing shield portion removably connected to said attachment portion, said second wing shield portion being so configured and connected thereto such that said second wing shield portion blocks at least a portion of heat generated by said motorcycle from contacting an operator seated on said motorcycle when said apparatus is installed on said motorcycle and said motorcycle is in motor operation,
   wherein said first and said second wing shield portions are user removable from said attachment portion without removing said attachment portion from attachment to said motorcycle, and are located on opposite lateral sides of said attachment portion such that when said heat shield apparatus is installed on a motorcycle, said first and said second wing shield portions block at least a portion of heat generated by said motorcycle from contacting right and left legs and sides of an operator seated on said motorcycle when said apparatus is installed on said motorcycle and said motorcycle is in motor operation; and
   a vehicle forward portion and a vehicle rearward portion;
   a first auxiliary wing shield portion extending generally proximal from said rearward portion, said first auxiliary wing shield portion being so sized, configured, and located such that said first auxiliary wing shield portion blocks at least a portion of heat generated by said motorcycle from contacting a backseat passenger on said motorcycle when said apparatus is installed on said motorcycle and said motorcycle is in motor operation; and
   a second auxiliary wing shield portion extending generally proximal from said rearward portion, said second auxiliary wing shield portion being so sized, configured, and located such that said second auxiliary wing shield portion blocks at least a portion of heat generated by said motorcycle from contacting a backseat passenger on said motorcycle when said apparatus is installed on said motorcycle and said motorcycle is in motor operation.

2. A heat shield apparatus according to claim 1 wherein said first and said second auxiliary wing shield portions are located on opposite lateral sides of said attachment portion such that when said heat shield apparatus is installed on a motorcycle, said first and said second auxiliary wing shield portions block at least a portion of heat generated by said motorcycle from contacting right and left legs and sides of a backseat passenger on said motorcycle when said apparatus is installed on said motorcycle and said motorcycle is in motor operation.

3. A heat shield apparatus according to claim 2 wherein said first and said second auxiliary wing shield portions are user detachable from said apparatus without removing said attachment portion from attachment to said motorcycle.

4. A heat shield apparatus according to claim 3 wherein said first and said second wing shield portions and said first and said second auxiliary wing shield portions each comprise at least a fire retardant layer and an insulating layer.

5. A heat shield apparatus according to claim 4 wherein said first and said second wing shield portions and said first and said second auxiliary wing portions each have a cross-section comprising a sandwich of layers comprising: a first outer durable layer; a middle insulating layer having a heat reflecting/deflecting layer bonded thereto; and a second outer layer comprising a fire retardant layer.

6. A heat shield apparatus according to claim 4 wherein said attachment portion comprises a generally planar flexible panel having first and second laterally extending sides detachably connected to said first and said wing shield portions, respectively, and wherein said attachment portion attaches to a motorcycle via installation under a vehicle operator seat.

7. A heat shield apparatus for a motorcycle comprising: an attachment portion configured for attaching to an area of a motorcycle proximal a vehicle operator seat of said motorcycle; a first wing shield portion connected to said attachment portion, said first wing shield portion being so configured and connected thereto such that said first wing shield portion blocks at least a portion of heat generated by said motorcycle from contacting an operator seated on said motorcycle when said apparatus is installed on said motorcycle and said motorcycle is in motor operation; a second wing shield portion connected to said attachment portion, said second wing shield portion being so configured and connected thereto such that said second wing shield portion blocks at least a portion of heat generated by said motorcycle from contacting an operator seated on said motorcycle when said apparatus is installed on said motorcycle and said motorcycle is in motor operation; and wherein said heat shield apparatus includes a vehicle forward portion and a vehicle rearward portion and further includes: a first auxiliary wing shield portion extending generally proximal from said rearward portion, said first auxiliary wing shield portion being so sized, configured, and located such that said first auxiliary wing shield portion blocks at least a portion of heat generated by said motorcycle from contacting a backseat passenger on said motorcycle when said apparatus is installed on said motorcycle and said motorcycle is in motor operation; and a second auxiliary wing shield portion extending generally proximal from said rearward portion, said second auxiliary wing shield portion being so sized, configured, and located such that said second auxiliary wing shield portion blocks at least a portion of heat generated by said motorcycle from contacting a backseat passenger on said motorcycle when said apparatus is installed on said motorcycle and said motorcycle is in motor operation.

8. A heat shield apparatus according to claim 7 wherein said first and said second wing shield portions are located on opposite lateral sides of said attachment portion such that when said heat shield apparatus is installed on a motorcycle, said first and said second wing shield portions block at least a portion of heat generated by said motorcycle from contacting right and left legs and sides of an operator seated on said motorcycle when said apparatus is installed on said motorcycle and said motorcycle is in motor operation; and wherein said first and said second auxiliary wing shield portions are located on opposite lateral sides of said attachment portion such that when said heat shield apparatus is installed on a motorcycle, said first and said second auxiliary wing shield portions block at least a portion of heat generated by said motorcycle from contacting right and left legs and sides of a backseat passenger on said motorcycle when said apparatus is installed on said motorcycle and said motorcycle is in motor operation.

9. A heat shield apparatus according to claim 8 wherein said first and said second wing shield portions and said first and said second auxiliary wing shield portions each comprise at least a fire retardant layer and an insulating layer.

10. A heat shield apparatus according to claim 9 wherein said attachment portion comprises a generally planar flexible panel having first and second laterally extending sides detachably connected to said first and said wing shield portions, respectively, and wherein said attachment portion attaches to a motorcycle via installation under a vehicle operator seat.

11. In combination, a motorcycle having installed thereon a heat shield apparatus according to claim 7.

* * * * *